US010523314B2

(12) United States Patent
Baudoin et al.

(10) Patent No.: US 10,523,314 B2
(45) Date of Patent: Dec. 31, 2019

(54) METHOD FOR ALLOCATING FREQUENCIES IN A MULTIBEAM SATELLITE RADIOCOMMUNICATIONS SYSTEM, AND ASSOCIATED SYSTEM

(71) Applicants: INSTITUT NATIONAL POLYTECHNIQUE DE TOULOUSE, Toulouse (FR); THALES, Courbevoie (FR)

(72) Inventors: Cédric Baudoin, Toulouse (FR); Yoann Couble, Toulouse (FR); Thibault Deleu, Toulouse (FR); Jean-Baptiste Dupe, Toulouse (FR); Emmanuel Chaput, Toulouse (FR)

(73) Assignees: INSTITUT NATIONAL POLYTECHNIQUE DE TOULOUSE, Toulouse (FR); THALES, Courbevoie (FR)

( * ) Notice: Subject to any disclaimer, the term of this patent is extended or adjusted under 35 U.S.C. 154(b) by 0 days.

(21) Appl. No.: 16/277,905

(22) Filed: Feb. 15, 2019

(65) Prior Publication Data

US 2019/0260465 A1    Aug. 22, 2019

(30) Foreign Application Priority Data

Feb. 22, 2018    (FR) ..................... 18 00157

(51) Int. Cl.
*H04B 7/204*    (2006.01)
*H04L 5/00*    (2006.01)

(52) U.S. Cl.
CPC ......... *H04B 7/2041* (2013.01); *H04B 7/2045* (2013.01); *H04L 5/0039* (2013.01)

(58) Field of Classification Search
CPC .................. H04B 7/18513; H04B 7/2041; H04B 7/0408; H04B 7/2045
See application file for complete search history.

(56) References Cited

U.S. PATENT DOCUMENTS

2017/0294996 A1\* 10/2017 Lee .................. H04B 7/18582

FOREIGN PATENT DOCUMENTS

EP    3 018 836 A1    5/2016
EP    3 082 275 A1    10/2016
EP    3 182 614 A1    6/2017

\* cited by examiner

*Primary Examiner* — Keith Ferguson
(74) *Attorney, Agent, or Firm* — Baker & Hostetler LLP

(57) ABSTRACT

A method for allocating frequencies in a multibeam satellite radiocommunications system is provided, wherein a geographical service zone covered by the system is broken down into a plurality of cells, distributed into a first grid and a second grid of cells, the cells of the first grid and the cells of the second grid being respectively associated with opposing polarizations of the transmission signals; a cell is broken down into two parts, one part being respectively associated with a colour corresponding to a frequency sub-band and to the polarization of the grid to which it belongs, the total frequency band being broken down into three frequency sub-bands; and two contiguous cell parts of one and the same grid are associated with different colours.

3 Claims, 6 Drawing Sheets

FFR

Band per spot = ½ total band band per spot = 1/4 total band band per spot = 1/3 total band 6 colours with 2 colours per cell

METHOD FOR ALLOCATING FREQUENCIES IN A MULTIBEAM SATELLITE RADIOCOMMUNICATIONS SYSTEM, AND ASSOCIATED SYSTEM

CROSS-REFERENCE TO RELATED APPLICATIONS

This application claims priority to foreign French patent application No. FR 1800157, filed on Feb. 22, 2018, the disclosure of which is incorporated by reference in its entirety.

FIELD OF THE INVENTION

The invention relates to a method for allocating frequencies in a multibeam satellite radiocommunications system, and an associated system.

BACKGROUND

Modern high-throughput radiocommunications satellites offer high transmission capacities, of the order of hundreds of Gbps (100 to 600 Gbps), by virtue of the use of thin antenna beams, combined with spatial frequency resource reuse in a fixed wide band and with an effective strategy for the adaptive modulation and coding of the transmission channels.

Optimizing transmission capacity is a major challenge, and frequency reuse techniques are a key element thereof.

Frequency reuse techniques are known that are commonly called two-colour, four-colour or FFR for fractional frequency reuse colour schemes.

Among the conventional frequency reuse schemes, the scheme that corresponds to an allocation of four separate sub-bands over all of the coverage cells or spots of the multibeam antenna in accordance with a four-colour pattern is well known. A four-colour frequency reuse scheme, denoted using the acronym 4-FR for "4 colours frequency", divides the entire frequency band allocated to the system into four separate frequency sub-bands. A colour corresponds to a sub-band and an associated polarization (out of the two possible polarizations: Right Hand Circular Polarization RHCP and Left Hand Circular Polarisation LHCP).

A 4-colour colour scheme 4-FR allows adjacent beams of the transmit or receive satellite antenna to be transmitted on the various sub-bands on an outward channel from the satellite to the ground, or to be received on the various sub-bands on a return channel from the ground to the satellite. A four-colour frequency reuse scheme 4-FR makes it possible to have a constant minimum inter-beam distance between beams of the same colour, and therefore to achieve a reasonable compromise between the reuse factor of the frequency band and the isolation between the beams so as to limit interference.

Also known is a two-colour frequency reuse scheme, which leads to very high levels of interfering elements.

FIGS. 1, 2 and 3 respectively show the frequency plans for a two-colour, a four-colour and a fractional frequency reuse FFR colour scheme.

As illustrated in FIGS. 4a and 4b, a 4-colour fractional frequency reuse (FFR) scheme is also known (there is a mixture of 4 colours at the spot border and 2 colours at the spot centre (which is simply the joining of the 2 colours of like polarization of one polarization of a 4-colour scheme)), wherein a sub-band common to all of the cells is allocated to an inner zone of each cell Cell.

FIG. 4a corresponds to hexagonal cells, and FIG. 4b corresponds to square cells.

A first polarization state and a second polarization state are respectively allocated to the cells of a first grid G1 and to the cells of a second grid G2.

The cells of the first grid G1 have a colour A allocated to a central inner zone of each cell, and two other colours B and C respectively allocated to the other non-central part of each cell, such that two contiguous cells of the first grid G1 do not have the same colour B or C in their respective outer part.

Similarly, the cells of the second grid G2 have a colour D allocated to a central inner zone of each cell, and two other colours E and F respectively allocated to the other non-central part of each cell, such that two contiguous cells of the second grid G2 do not have the same colour E or F in their respective outer part.

The colours A, B, C and D, E, F generally correspond to the same division into frequency sub-bands; only the polarizations are different.

In FIG. 4a, with hexagonal cells, the central part, indexed a, of a cell is taken as reference, whose significant interfering elements are the central parts, indexed b, of two cells, whose less significant interfering elements are the central parts, indexed c, of two cells, and whose even less significant interfering elements are the central parts, indexed d, of four cells.

In FIG. 4b, with square cells, the central part, indexed a, of a cell is taken as reference, whose significant interfering elements are the central parts, indexed b, of four cells, and whose less significant interfering elements are the central parts, indexed c, of four cells.

SUMMARY OF THE INVENTION

One aim of the invention is to overcome the abovementioned problems, and notably to limit interfering elements, with an improved frequency reuse rate.

What is proposed, according to one aspect of the invention, is a method for allocating frequencies in a multibeam satellite radiocommunications system, wherein:
- a geographical service zone covered by the system is broken down into a plurality of hexagonal or square cells, distributed into a first grid and a second grid of cells, the cells of the first grid and the cells of the second grid being respectively associated with opposing polarizations of the transmission signals;
- a cell is broken down into two parts, one part being respectively associated with a colour corresponding to a frequency sub-band and to the polarization of the grid to which it belongs, the total frequency band being broken down into three frequency sub-bands; and
- two contiguous cell parts, able to be superimposed, of one and the same grid are associated with different colours.

Such frequency allocation, of limited complexity, makes it possible to improve the capacity of the return channel of multispot or multicell systems, and the distances between interfering cells are maximized.

In one embodiment, the frequency sub-bands are of the same width, corresponding to a third of the total frequency bandwidth.

Thus, in comparison with an FFR scheme, the used frequency band is minimized: in each cell, ⅔ of the frequency band is used, whereas an FFR scheme would use the entire frequency band.

According to another aspect of the invention, there is also proposed a system for allocating frequencies in a multibeam satellite radiocommunications system, configured so as to implement the method according to the above description.

BRIEF DESCRIPTION OF THE DRAWINGS

The invention will be better understood upon studying a few embodiments, described by way of entirely nonlimiting example and illustrated by the appended drawings, in which.

In all of the figures, elements having identical references are similar.

DETAILED DESCRIPTION

Figure 5A:
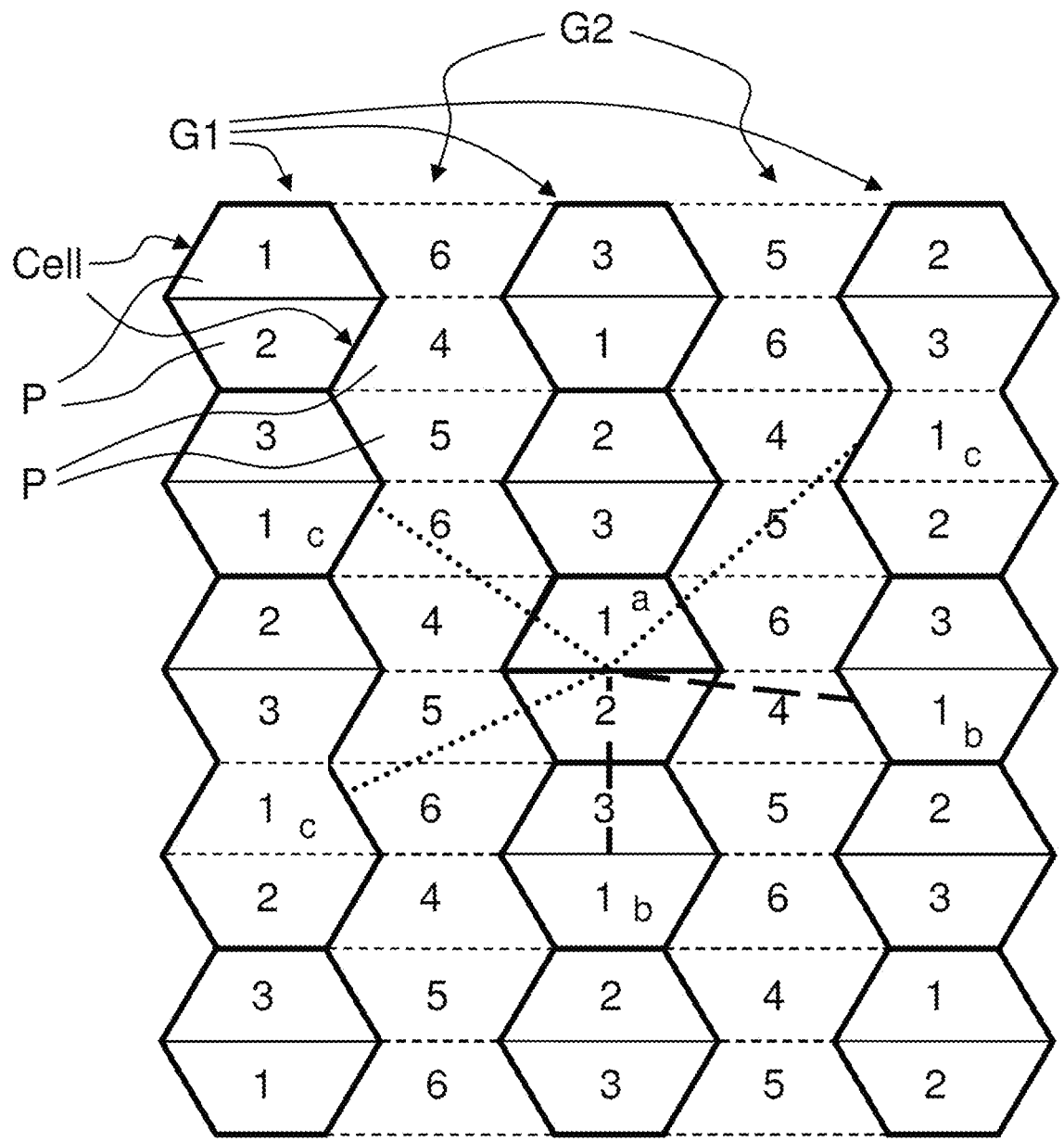
FIG. 5a schematically illustrates a hexagonal-cell colour scheme, according to one aspect of the invention.

In FIG. 5a, a first polarization state and a second polarization state are respectively allocated to the cells of a first grid G1 and to the cells of a second grid G2.

The hexagonal cells of the first grid G1 are all separated identically into two parts P, which are for example equal. The total frequency band is broken down into three frequency sub-bands, in this case having the same frequency width. Three colours 1, 2 and 3 are allocated for the first grid G1 corresponding to a first polarization state. Each part P of a cell Cell of the first grid G1 is associated with one of the three colours 1, 2 and 3, such that two contiguous cell parts are associated with different frequency sub-bands.

Similarly, the hexagonal cells of the second grid G2 are all separated identically into two parts P, which are for example equal. The total frequency band is broken down into three frequency sub-bands, in this case having the same frequency width and being identical to the breakdown performed for the first grid G1. Three colours 4, 5 and 6 are allocated for the second grid G2 corresponding to a second polarization state, opposite to that of the first grid G1. Each part P of a cell Cell of the second grid G2 is associated with one of the three colours 4, 5 and 6, such that two contiguous cell parts are associated with different frequency sub-bands.

The colours 1, 2, 3 and 4, 5, 6 generally correspond to the same division into frequency sub-bands; only the polarizations are different.

Figure 1:
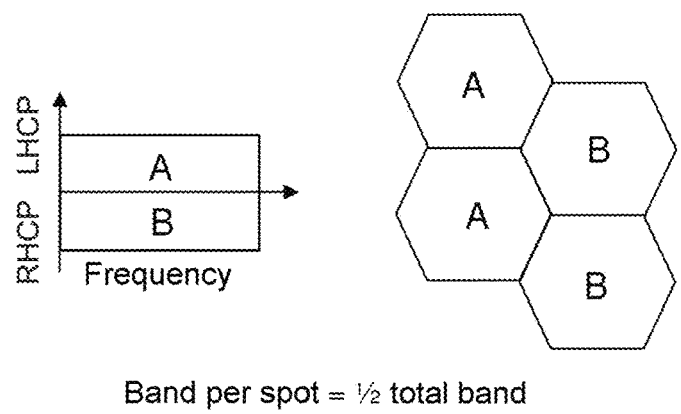
FIGS. 1, 2 and 3 schematically show the frequency plans for a two-colour, a four-colour and a fractional frequency reuse FFR colour scheme, according to the prior art.
Figure 2:
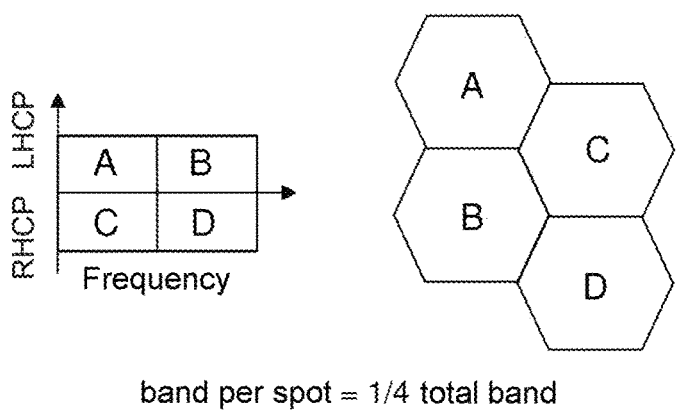
Figure 3:
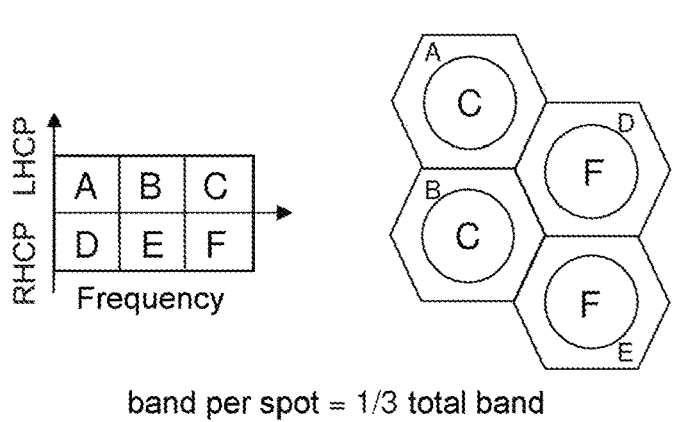
Figure 4A:
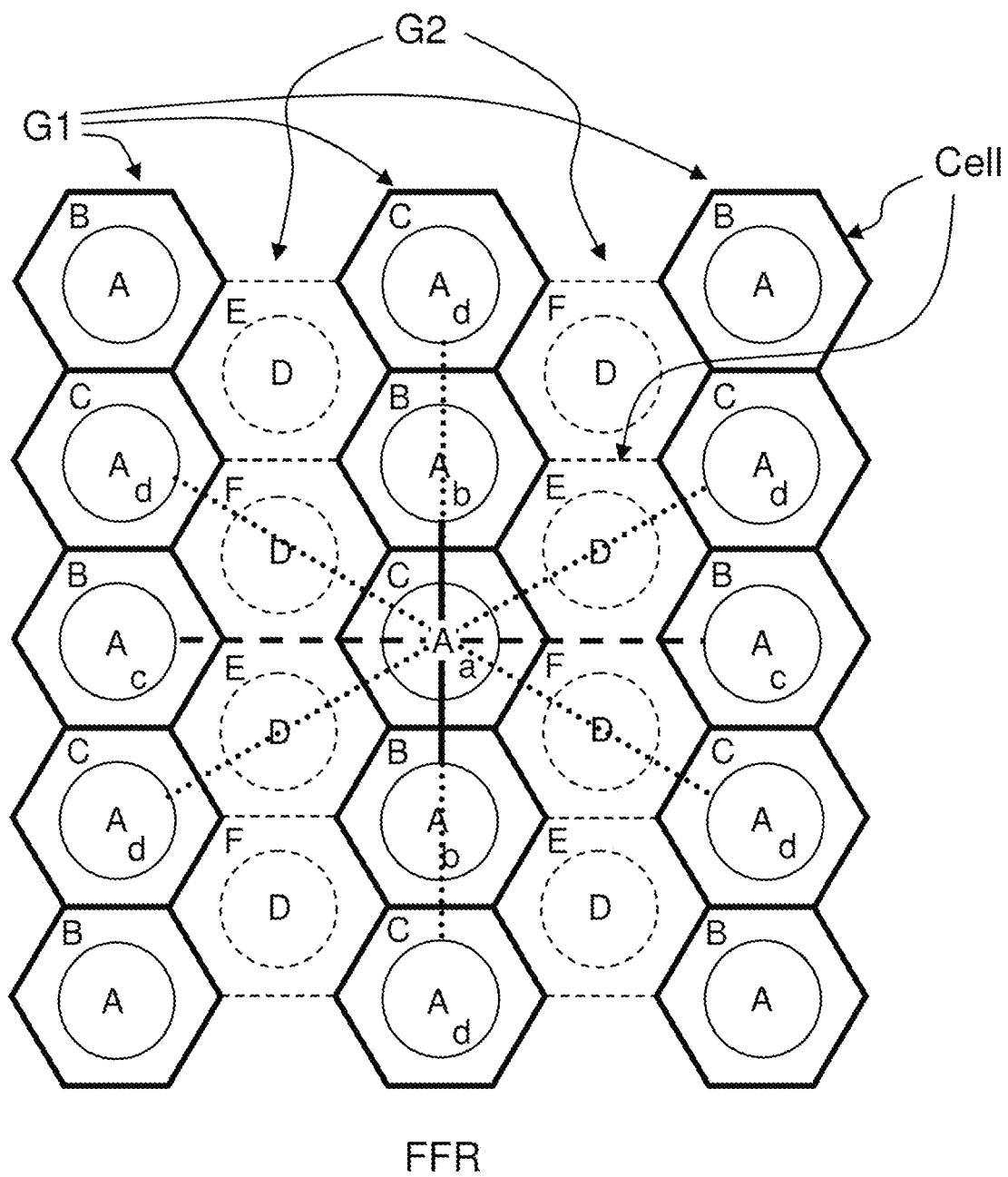
FIG. 4a schematically illustrates a hexagonal-cell FFR colour scheme, according to the prior art.

As illustrated in FIG. 5a, in comparison with the hexagonal FFR colour scheme of FIG. 4a, the hexagonal-cell colour scheme according to the invention makes it possible to minimize interfering elements, i.e. to increase the distances between the interfering zones, and makes it possible to reduce the frequency band to be processed (⅔ of the frequency band of the FFR scheme).

Figure 5B:
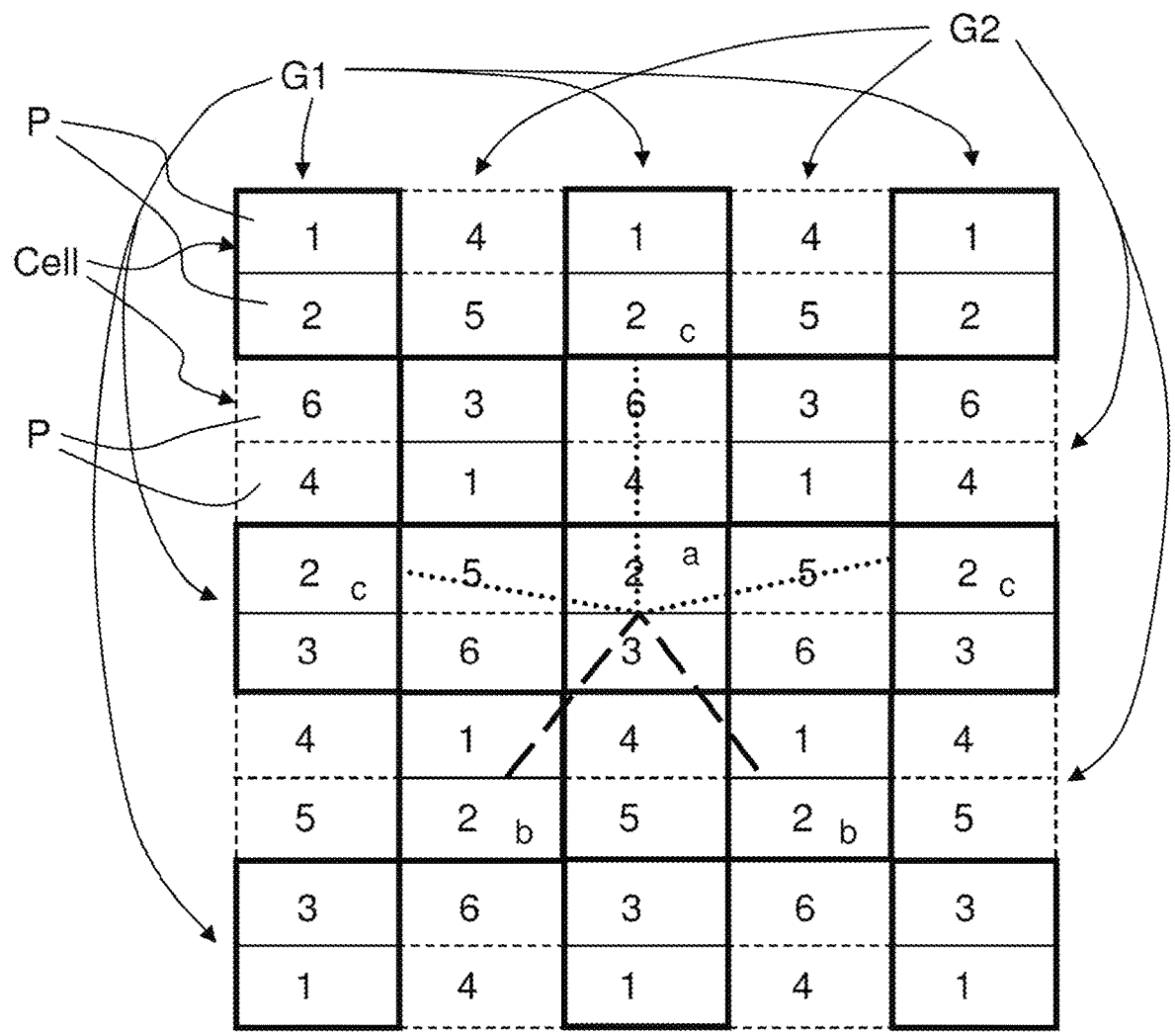
FIG. 5b schematically illustrates a square-cell colour scheme, according to one aspect of the invention.

In FIG. 5b, a first polarization state and a second polarization state are respectively allocated to the cells of a first grid G1 and to the cells of a second grid G2.

The square cells of the first grid G1 are all separated identically into two parts P, which are for example equal. The total frequency band is broken down into three frequency sub-bands, in this case having the same frequency width. Three colours 1, 2 and 3 are allocated for the first grid G1 corresponding to a first polarization state. Each part P of a cell Cell of the first grid G1 is associated with one of the three colours 1, 2 and 3, such that two contiguous cell parts are associated with different frequency sub-bands.

Similarly, the square cells of the second grid G2 are all separated identically into two parts P, which are for example equal. The total frequency band is broken down into three frequency sub-bands, in this case having the same frequency width and being identical to the breakdown performed for the first grid G1. Three colours 4, 5 and 6 are allocated for the second grid G2 corresponding to a second polarization state, opposite to that of the first grid G1. Each part P of a cell Cell of the second grid G2 is associated with one of the three colours 4, 5 and 6, such that two contiguous cell parts are associated with different frequency sub-bands.

The colours 1, 2, 3 and 4, 5, 6 generally correspond to the same division into frequency sub-bands; only the polarizations are different.

Figure 4B:
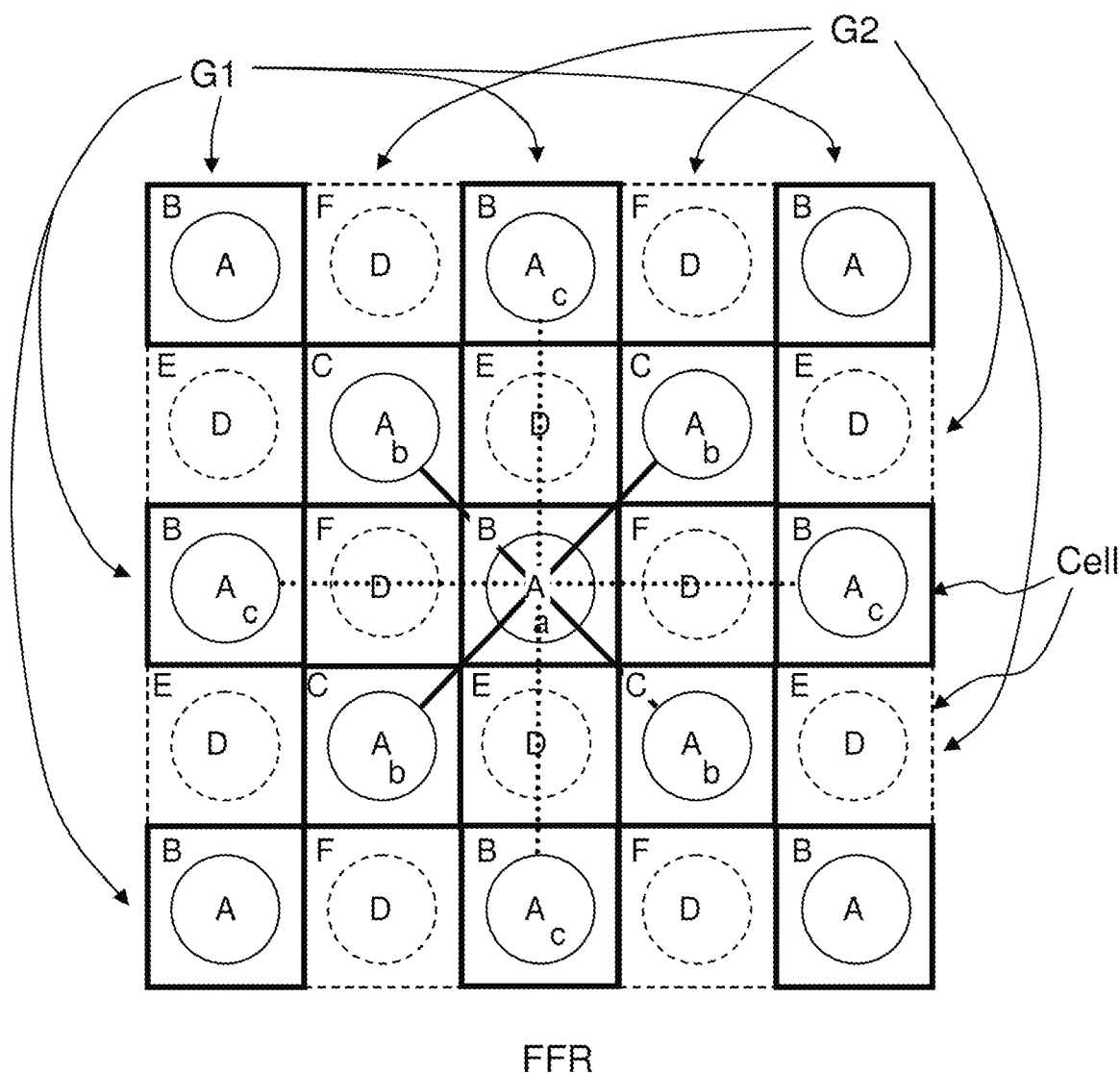
FIG. 4b schematically illustrates a square-cell FFR colour scheme, according to the prior art.

As illustrated in FIG. 5b, in comparison with the square FFR colour scheme of FIG. 4b, the square-cell colour scheme according to the invention makes it possible to minimize interfering elements, i.e. to increase the distances between the interfering zones, and makes it possible to reduce the frequency band to be processed (⅔ of the frequency band of the FFR scheme), i.e. to increase capacity.

Figure 6:
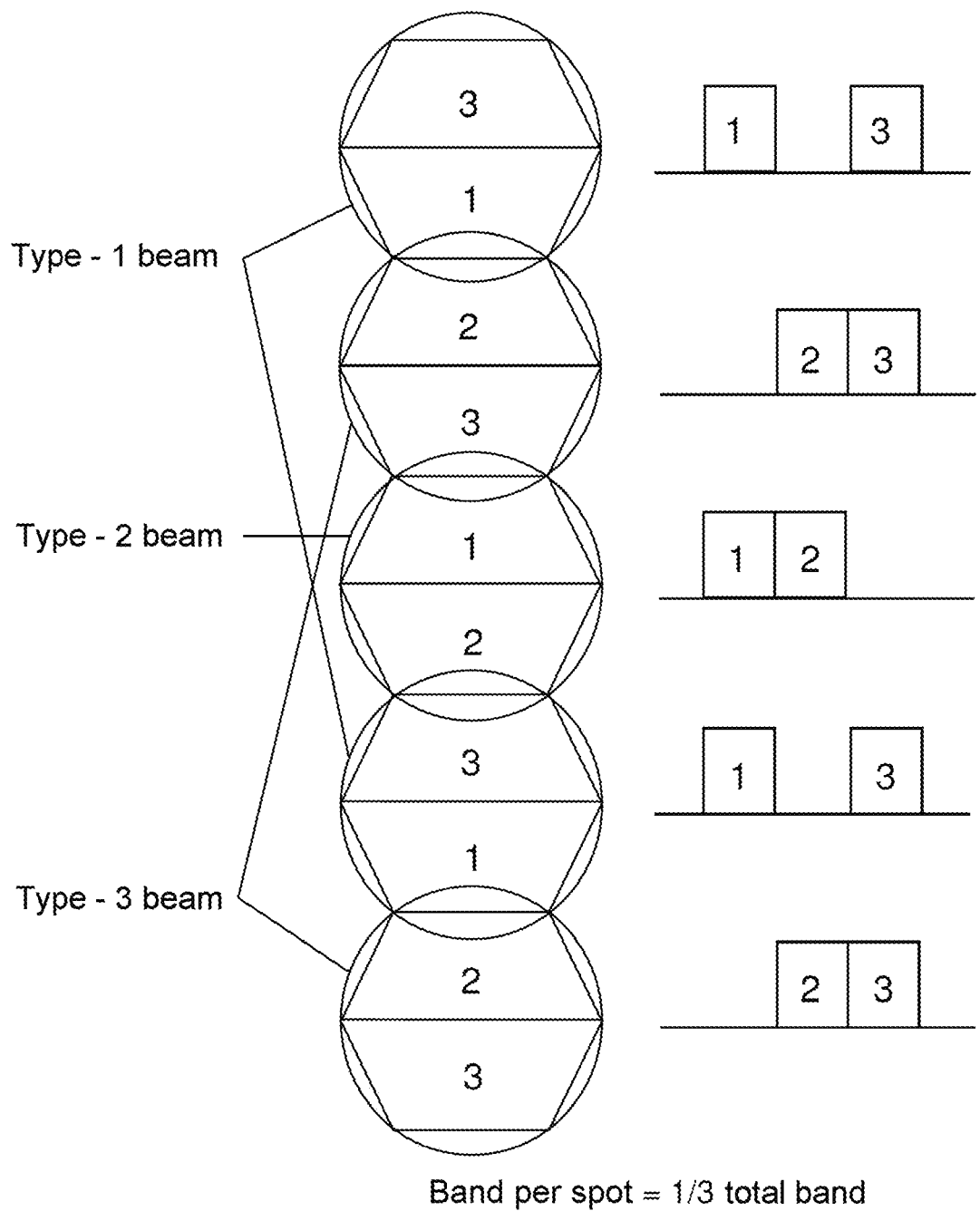
FIG. 6 schematically illustrates the frequency plan for a colour scheme according to FIG. 5a, according to one aspect of the invention.

FIG. 6 shows the frequency plan for a colour scheme according to FIG. 5a.

The invention claimed is:

1. A method for allocating frequencies in a multibeam satellite radiocommunications system, wherein:
   a geographical service zone covered by the system is broken down into a plurality of hexagonal or square cells, distributed into a first grid and a second grid of cells, the cells of the first grid and the cells of the second grid being respectively associated with opposing polarizations of the transmission signals;
   a cell is broken down into two parts, one part being respectively associated with a colour corresponding to a frequency sub-band and to the polarization of the grid to which it belongs, the total frequency band being broken down into three frequency sub-bands; and
   two contiguous cell parts, able to be superimposed, of one and the same grid are associated with different colours.

2. The method according to claim 1, wherein the frequency sub-bands are of the same width, corresponding to a third of the total frequency bandwidth.

3. A system for allocating frequencies in a multibeam satellite radiocommunications system, configured so as to implement the method according to claim 1.

\* \* \* \* \*